United States Patent
Lai et al.

(10) Patent No.: US 11,937,138 B2
(45) Date of Patent: Mar. 19, 2024

(54) BEAMFORMING-BASED INTER-FREQUENCY LOAD BALANCING

(71) Applicant: Telefonaktiebolaget LM Ericsson (publ), Stockholm (SE)

(72) Inventors: Xiaoming Lai, Ottawa (CA); Weigang Li, Ottawa (CA); Xixian Chen, Ottawa (CA); Dongsheng Yu, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 333 days.

(21) Appl. No.: 17/292,533

(22) PCT Filed: Nov. 12, 2018

(86) PCT No.: PCT/IB2018/058873
§ 371 (c)(1),
(2) Date: May 10, 2021

(87) PCT Pub. No.: WO2020/099904
PCT Pub. Date: May 22, 2020

(65) Prior Publication Data
US 2021/0400551 A1 Dec. 23, 2021

(51) Int. Cl.
*H04W 36/06* (2009.01)
*H04B 7/0452* (2017.01)
(Continued)

(52) U.S. Cl.
CPC .......... *H04W 36/06* (2013.01); *H04B 7/0452* (2013.01); *H04W 16/28* (2013.01); *H04W 36/22* (2013.01)

(58) Field of Classification Search
CPC ..... H04W 36/06; H04W 16/28; H04W 36/22; H04B 7/0452; H04B 7/0617; H04B 7/0695
See application file for complete search history.

(56) References Cited

U.S. PATENT DOCUMENTS 9,609,564 B2 * 3/2017 Davydov ............ H04W 64/003
2014/0119265 A1   5/2014 Shauh et al.
(Continued)

FOREIGN PATENT DOCUMENTS

WO    2019/086928 A1    5/2019

OTHER PUBLICATIONS

Afroz et al. SINR RSRP RSSI and RSRQ measurements in LTE Networks, International Journal of Wireless & Mobile Networks (IJWMN) vol. 7, No. 4, Aug. 2015 (Year: 2015).*
(Continued)

*Primary Examiner* — Ayaz R Sheikh
*Assistant Examiner* — David Zhijun Sun
(74) *Attorney, Agent, or Firm* — Christopher & Weisberg, P.A.

(57) ABSTRACT

A network node, wireless device, method and system are provided. In one or more embodiments, a network node (16) for servicing a plurality of wireless devices (22) using a plurality of carriers is provided. Each carrier of the plurality of carriers is configured with a respective plurality of beams. The network node (16) includes processing circuitry (68) configured to: determine a metric associated with Multiple User-Multiple Input Multiple Output, MU-MEMO, usage with respect to the plurality of carriers, and initiate at least one handover of at least one of the plurality of wireless devices (22) to a different carrier of the plurality of carriers based at least in part on the metric.

24 Claims, 9 Drawing Sheets

(51) Int. Cl.
*H04W 16/28* (2009.01)
*H04W 36/22* (2009.01)

(56) References Cited

U.S. PATENT DOCUMENTS

2016/0277972 A1* 9/2016 Ganu ................ H04W 28/0808
2017/0034841 A1 2/2017 Bethanabhotla et al.
2017/0127327 A1 5/2017 Newbury et al.
2018/0220340 A1* 8/2018 Ramachandra ....... H04W 36/20

OTHER PUBLICATIONS

Seisa et al. LTE—The UMTS Long Term Evolution From Theory to Practice Second Edition, Wiley (Year: 2011).*
International Search Report and Written Opinion dated Jul. 3, 2018 issued in PCT Application No. PCT/IB2018/058873, consisting of 15 pages.

* cited by examiner

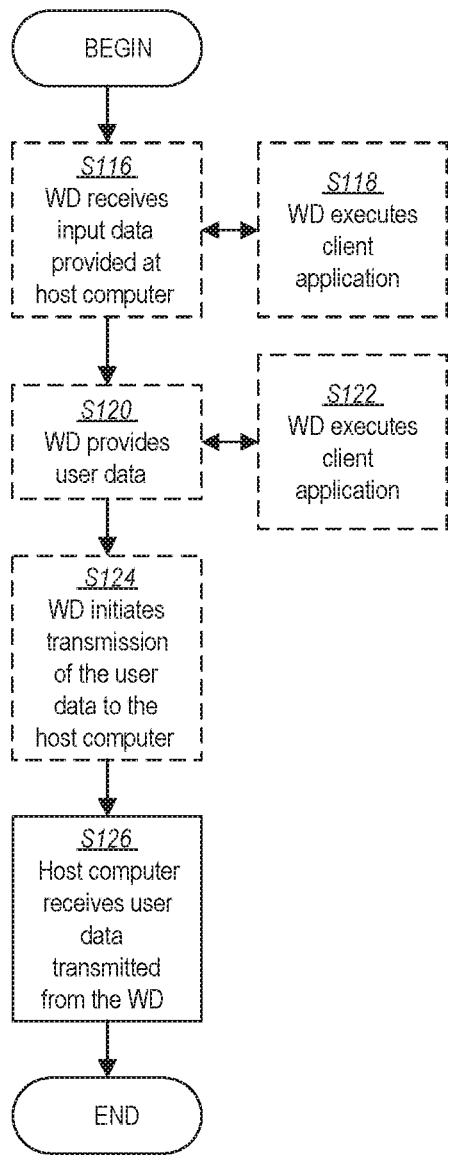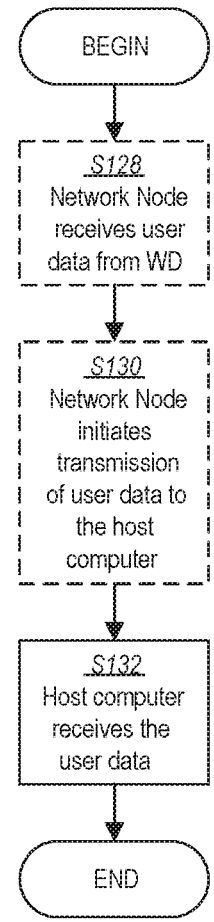
FIG. 6
FIG. 7

BEAMFORMING-BASED INTER-FREQUENCY LOAD BALANCING

CROSS-REFERENCE TO RELATED APPLICATIONS

This application is a Submission Under 35 U.S.C. § 371 for U.S. National Stage Patent Application of International Application Number: PCT/IB2018/058873, filed Nov. 12, 2018 entitled "BEAMFORMING-BASED INTER-FREQUENCY LOAD BALANCING," the entirety of which is incorporated herein by reference.

FIELD

The present disclosure relates to wireless communications, and in particular, to beamforming-based inter-frequency load balancing for Multi-User Multiple-Input-Multiple-Output for modifying a distribution of wireless devices among one or more beams/carriers.

INTRODUCTION

In wireless communications, a cell resource and/or capacity may be based on the assumption that a time-frequency domain physical resource block (PRB) could only be used by one wireless device. The introduction of the Beam Forming (BF) based Multi-User (MU)-Multiple-Input-Multiple-Output (MIMO) rendered this assumption obsolete since the same PRB can be shared by multiple wireless devices at different MIMO layers at the same time. An example of a MU-MIMO system 2 is illustrated in FIG. 1 where the load distribution pattern limits MU-MIMO opportunities, i.e., limits an opportunity for one or more MU-MIMO enabled wireless devices to participate in MU-MIMO. In FIG. 1, network node 4 has three carriers such as carrier 1 (C1), carrier 2 (C2) and carrier 3 (C3) (collectively referred to as carrier C) that all have the same or similar physical coverage. Each carrier C has three beams such as beam 1 (B1), beam 2 (B2) and beam 3 (B3) (collectively referred to as beam B). In general, a beam may be referred to by its carrier/beam pairing denoted by BXY where X indicates the carrier and Y indicates the beam. For example, B11 refers to carrier 1/beam 1 while B33 refers to carrier 3/beam 3. There are some wireless devices 6 physically located in a physical area 8 that is serviced by these three carriers C.

By applying an existing load balancing model, a respective quantity of wireless device 6 per each of these three carriers C may be equal, i.e., wireless device 6 are equally distributed over these three carriers C. The amount of traffic (or traffic requirement) from these wireless devices 6 is assumed to be equal or similar. Therefore, these three carriers C are considered to be load balanced.

However, there is a chance that the wireless device 6 in each carrier are all located in the same beam as illustrated in FIG. 1 since existing load balance models do not take beam dimension into consideration. In such case, wireless device 6 paring for MU-MIMO is not possible. In other words, taking MU-MIMO into consideration, while existing systems would configure a system to be load balanced as illustrated in FIG. 1, this configuration of wireless devices 6 is not well distributed and negatively affects system 2's ability to perform MU-MIMO.

SUMMARY

Some embodiments advantageously provide methods, systems, network nodes and wireless device for beamforming based inter-frequency load balancing for MU-MIMO for modifying a distribution of wireless devices among one or more beams/carriers.

The instant disclosure advantageously provides for beam-based inter-frequency load balancing (IFLB) for Multi-User MIMO (MU-MIMO) arrangements. In one or more embodiments, based on criteria, the wireless devices in one beam/carrier may be directed to the beam(s) in other carrier(s) where the wireless devices have more pairing opportunity for MU-MIMO. Since the pairing opportunities of MU-MIMO are increased, the carrier/network throughput and capacity are increased.

The beam-based inter-frequency load balance for MU-MIMO may include monitoring of a quantity of wireless device in each beam of all the carriers, monitoring the pairing situation and efficiency rate of each carrier, monitoring the cell capacity of each carrier and performing a decision on how and when to move the wireless device between carriers based on at least a portion of the monitored data. In one or more embodiments, beam-based inter-frequency load balance is performed at the beam level with the aim of increasing MU-MIMO opportunities. In one or more embodiments, MU-MIMO opportunity refers to one or more situations where MU-MIMO pairing between at least two wireless devices can be performed and/or implemented in the wireless device distribution. In one or more embodiments, MU-MIMO opportunity signifies that two or more wireless devices can be paired where they may or may not be able to be scheduled due to one or more of an applied scheduler algorithm, resource, channel conditions, data size or other factors.

According to one aspect of the disclosure, a network node for servicing a plurality of wireless devices using a plurality of carriers is provided. Each carrier of the plurality of carriers is configured with a respective plurality of beams. The network node includes processing circuitry configured to determine a metric associated with Multiple User-Multiple Input Multiple Output, MU-MIMO, usage with respect to the plurality of carriers, and initiate at least one handover of at least one of the plurality of wireless devices to a different carrier of the plurality of carriers based at least in part on the metric.

According to one embodiment of this aspect, the handover configured to increase MU-MIMO opportunities for the plurality of wireless devices when compared to MU-MIMO opportunities before the at least one handover. According to one embodiment of this aspect, a respective quantity of wireless devices per each of the plurality of carriers remains the same following the at least one handover of the wireless device to the different carrier of the plurality of carriers. According to one embodiment of this aspect, a respective quantity of MIMO capable wireless devices per each of a plurality of beams are equal to each other following the at least one handover of the wireless device to the different carrier of the plurality of carriers. According to one embodiment of this aspect, the metric associated with the MU-MIMO usage is an MU-MIMO efficiency index for the plurality of carriers and the plurality of beams, the MU-MIMO efficiency index being based at least in part on a quantity of scheduled wireless devices per beam per carrier and a quantity of how often a wireless device in one beam and carrier is pair scheduled to share a same physical resource with another wireless device in another beam and same carrier. According to one embodiment of this aspect, the metric is per beam. According to one embodiment of this aspect, the metric is per carrier.

According to one embodiment of this aspect, the metric associated with the MU-MIMO usage corresponds to carrier capacity, such that if the metric increases, the carrier capacity increases. According to one embodiment of this aspect, the processing circuitry is further configured to update a frequency relation table, the frequency relation table including information indicating which carriers and beams received by each of the plurality of wireless devices meet a predefined threshold. According to one embodiment of this aspect, the processing circuitry is further configured to prioritize at least one beam and carrier for at least one wireless device of the plurality of wireless devices based at least in part on the frequency relation table, the at least one handover of the at least one of the plurality of wireless devices to the different carrier of the plurality of carriers being based at least in part on the prioritization of the at least one beam and carrier. According to one embodiment of this aspect, the at least one handover of the at least one of the plurality of wireless devices to the different carrier of the plurality of carriers is initiated if a quantity of scheduled wireless devices per beam per carrier is less than a predefined quantity threshold.

According to one embodiment of this aspect, the at least one handover of the at least one of the plurality of wireless devices to the different carrier of the plurality of carriers is initiated if the metric associated with MU-MIMO usage is less than a predefined usage threshold. According to one embodiment of this aspect, the at least one handover corresponds to a redistribution of the plurality of wireless devices scheduled on respective carriers and beams.

According to another aspect of the disclosure, a method for a network node for servicing a plurality of wireless devices using a plurality of carriers is provided. Each carrier of the plurality of carriers is configured with a respective plurality of beams. A metric associated with Multiple User-Multiple Input Multiple Output, MU-MIMO, usage with respect to the plurality of carriers is determined. At least one handover of at least one of the plurality of wireless devices to a different carrier of the plurality of carriers based at least in part on the metric is initiated.

According to one embodiment of this aspect, the handover configured to increase MU-MIMO opportunities for the plurality of wireless devices when compared to MU-MIMO opportunities before the at least one handover. According to one embodiment of this aspect, a respective quantity of wireless devices per each of the plurality of carriers remains the same following the at least one handover of the wireless device to the different carrier of the plurality of carriers. According to one embodiment of this aspect, a respective quantity of wireless devices per each of a plurality of beams is different following the at least one handover of the at least one of the plurality of wireless devices to the different carrier of the plurality of carriers. According to one embodiment of this aspect, the metric is per beam. According to one embodiment of this aspect, the metric is per carrier.

According to one embodiment of this aspect, the metric associated with the MU-MIMO usage is an MU-MIMO efficiency index for the plurality of carriers and the plurality of beams where the MU-MIMO efficiency index is based at least in part on a quantity of scheduled wireless devices per beam per carrier and a quantity of how often a wireless device in one beam and carrier is pair scheduled to share a same physical resource with another wireless device in another beam and same carrier. According to one embodiment of this aspect, the metric associated with the MU-MIMO usage corresponds to carrier capacity, such that if the metric increases, the carrier capacity increases. According to one embodiment of this aspect, a frequency relation table is updated where the frequency relation table includes information indicating which carriers and beams received by each of the plurality of wireless devices meet a predefined threshold.

According to one embodiment of this aspect, at least one beam and carrier for at least one wireless device of the plurality of wireless devices are prioritized based at least in part on the frequency relation table, the at least one handover of the at least one of the plurality of wireless devices to the different carrier of the plurality of carriers being based at least in part on the prioritization of the at least one beam and carrier. According to one embodiment of this aspect, the at least one handover of the at least one of the plurality of wireless devices to the different carrier of the plurality of carriers is initiated if a quantity of scheduled wireless devices per beam per carrier is less than a predefined quantity threshold. According to one embodiment of this aspect, the at least one handover of the at least one of the plurality of wireless devices to the different carrier of the plurality of carriers is initiated if the metric associated with MU-MIMO usage is less than a predefined usage threshold. According to one embodiment of this aspect, the at least one handover corresponds to a redistribution of the plurality of wireless devices scheduled on respective carriers and beams.

According to another aspect of the disclosure, a wireless device is provided where the wireless device is configured to use a first carrier of a plurality of carriers. The wireless device includes processing circuitry configured to: receive a handover message where the handover message is based at least in part on a metric associated with Multiple User-Multiple Input Multiple Output, MU-MIMO, usage with respect to the plurality of carriers, and perform handover to a different carrier of the plurality of carriers according to the received handover message.

According to one embodiment of this aspect, the handover configured to increase MU-MIMO opportunities for the plurality of wireless devices when compared to MU-MIMO opportunities before the at least one handover. According to one embodiment of this aspect, a respective quantity of wireless devices per each of the plurality of carriers remains the same following the at least one handover of the wireless device to the different carrier of the plurality of carriers. According to one embodiment of this aspect, a respective quantity of wireless devices per each of a plurality of beams is different following the at least one handover of the wireless device to the different carrier of the plurality of carriers.

According to another aspect of the disclosure, a method for a wireless device is provided where the wireless device is configured to use a first carrier of a plurality of carriers. A handover message is received where the handover message is based at least in part on a metric associated with Multiple User-Multiple Input Multiple Output, MU-MIMO, usage with respect to the plurality of carriers. Handover to a different carrier of the plurality of carriers according to the received handover message is performed. According to one embodiment of this aspect, the handover configured to increase MU-MIMO opportunities for the plurality of wireless devices when compared to MU-MIMO opportunities before the at least one handover.

According to one embodiment of this aspect, a respective quantity of wireless devices per each of the plurality of carriers remains the same following the at least one handover of the wireless device to the different carrier of the plurality of carriers. According to one embodiment of this aspect, a respective quantity of MIMO capable wireless devices per each of a plurality of beams are equal to each other following the at least one handover of the wireless device to the different carrier of the plurality of carriers.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 6 is a flowchart illustrating exemplary methods implemented in a communication system including a host computer, a network node and a wireless device for receiving user data from the wireless device at a host computer according to some embodiments of the present disclosure;

FIG. 7 is a flowchart illustrating exemplary methods implemented in a communication system including a host computer, a network node and a wireless device for receiving user data at a host computer according to some embodiments of the present disclosure;

DETAILED DESCRIPTION

Figure 1:
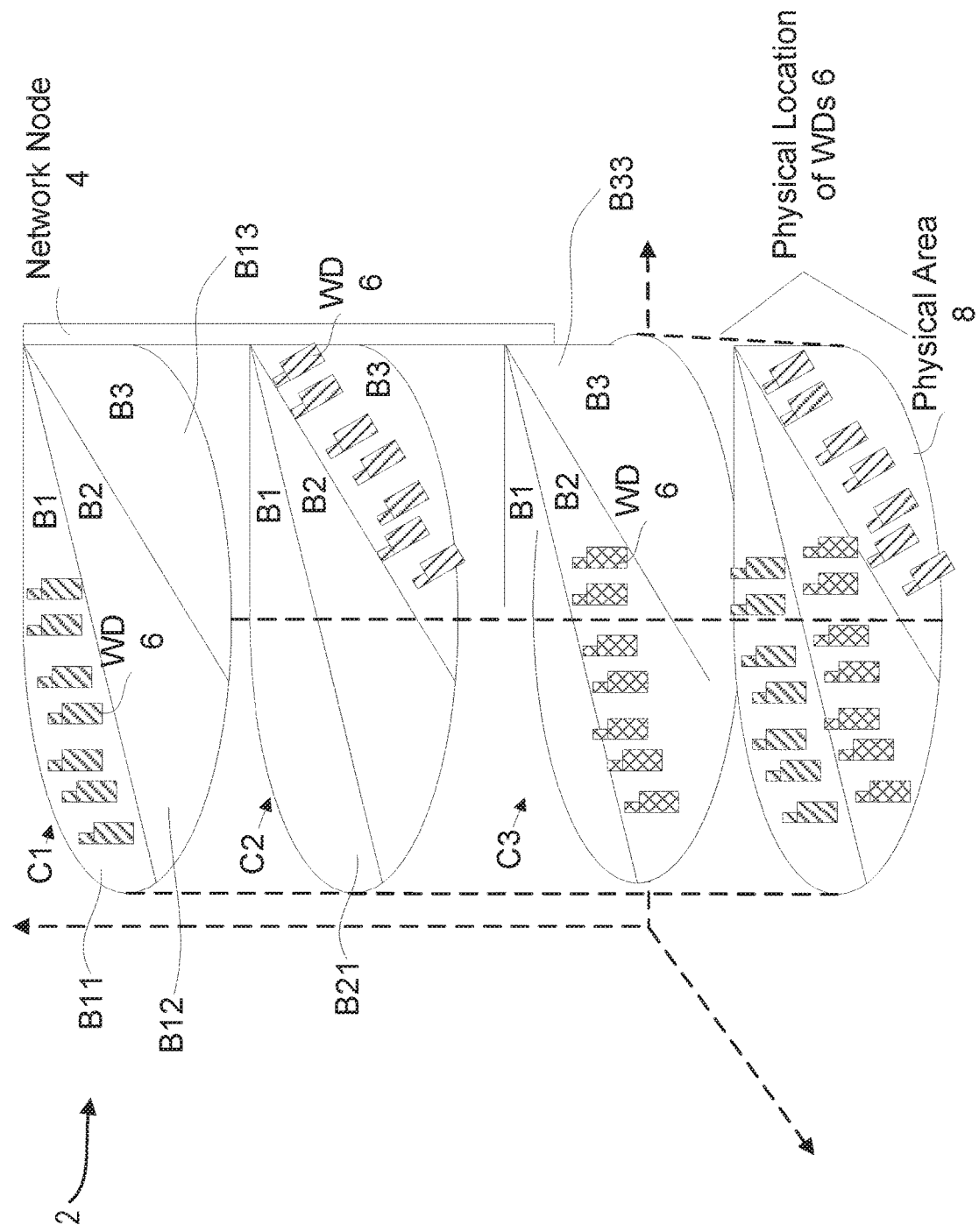
FIG. 1 is a diagram of a system implementing existing load balancing processes.

Existing load balance management models are no longer sufficient as these models inhibit the application of MU-MIMO technology that has the ability to increase carrier/network throughput and capacity. The instant disclosure helps at least in part solve at least a portion of the existing problems with existing systems by providing a new load assessment method and balancing algorithm at the beamforming or beam level. In one or more embodiments, wireless devices are separate out and/or redistributed onto various beams of one or more carriers in order to allow for the application of MU-MIMO and/or to increase MU-MIMO opportunities such as wireless device MU-MIMO pairing opportunities. In one or more embodiments, the new load basement method (i.e., beam-based inter-frequency load balance (IFLB)) increases MU-MIMO opportunities and/or MU-MIMO usage. While the description herein may use the word "load balance" to describe beam-based inter-frequency load balancing arrangements, it is understood that the applicability of the disclosure herein goes further than existing load balancing techniques as these existing techniques may result in a load balanced system but limit MU-MIMO opportunities and/or MU-MIMO usage. The beam-based inter-frequency load balance approach described herein helps redistribute at least one wireless device such as to help at least in part increase the opportunities for MU-MIMO use as compared with prior arrangements.

Before describing in detail exemplary embodiments, it is noted that the embodiments reside primarily in combinations of apparatus components and processing steps related to beamforming-based inter-frequency load balancing for MU-MIMO for modifying a distribution of wireless devices among one or more beams/carriers. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

The term resource used herein may correspond to any type of physical resource or radio resource expressed in terms of length of time and/or frequency. Signals are transmitted or received by a radio node over a time resource. Examples of time resources are: symbol, time slot, subframe, radio frame, Transmission Time Interval (TTI), interleaving time, etc.

The term time resource used herein may correspond to any type of physical resource or radio resource expressed in terms of length of time. Examples of time resources are: symbol, time slot, subframe, radio frame, TTI, interleaving time, etc.

The term TTI used herein may correspond to any time period (TO) over which a physical channel can be encoded and interleaved for transmission. The physical channel is decoded by the receiver over the same time period (TO) over which it was encoded. The TTI may also interchangeably called as short TTI (sTTI), transmission time, slot, sub-slot, mini-slot, short subframe (SSF), mini-subframe etc.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

A cell may be generally a communication cell, e.g., of a cellular or mobile communication network, provided by a node. A serving cell may be a cell on or via which a network node (the node providing or associated to the cell, e.g., base station, gNB or eNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the wireless device is configured and/or to which it is synchronized and/or has performed an access procedure, e.g., a random access procedure, and/or in relation to which it is in a RRC_connected or RRC_idle state, e.g., in case the node and/or wireless device and/or network follow the LTE-standard and/or NR-standard. One or more carriers (e.g., uplink and/or downlink carrier/s and/or a carrier for both uplink and downlink) may be associated to a cell.

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. WD) may comprise configuring the WD to perform certain measurements on certain subframes or radio resources and reporting such measurements according to embodiments of the present disclosure.

Data may refer to any kind of data, in particular any one of and/or any combination of control data or user data or payload data. Control information (which may also be referred to as control data) may refer to data controlling and/or scheduling and/or pertaining to the process of data transmission and/or the network or terminal operation.

The term "radio measurement" or "measurement" used herein may refer to any measurement performed on radio signals. Radio measurements can be absolute or relative. Radio measurement may be called as signal level which may be signal quality and/or signal strength. Radio measurements can be e.g. intra-frequency, inter-frequency, inter-RAT measurements, CA measurements, etc. Radio measurements can be unidirectional (e.g., DL or UL) or bidirectional (e.g., Round Trip Time (RTT), Receive-Transmit (Rx-Tx), etc.). Some examples of radio measurements: timing measurements (e.g., Time of Arrival (TOA), timing advance, RTT, Reference Signal Time Difference (RSTD), Rx-Tx, propagation delay, etc.), angle measurements (e.g., angle of arrival), power-based measurements (e.g., received signal power, Reference Signals Received Power (RSRP), received signal quality, Reference Signals Received Quality (RSRQ), Signal-to-interference-plus-noise Ratio (SINR), Signal Noise Ratio (SNR), interference power, total interference plus noise, Received Signal Strength Indicator (RSSI), noise power, etc.), cell detection or cell identification, radio link monitoring (RLM), system information (SI) reading, etc. The inter-frequency and inter-RAT measurements are carried out by the WD in measurement gaps unless the WD is capable of doing such measurement without gaps. Examples of measurement gaps are measurement gap id #0 (each gap of 6 ms occurring every 40 ms), measurement gap id #1 (each gap of 6 ms occurring every 80 ms), etc. The measurement gaps are configured at the WD by the network node.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Receiving (or obtaining) control information may comprise receiving one or more control information messages (e.g., an RRC monitoring parameter). It may be considered that receiving control signaling comprises demodulating and/or decoding and/or detecting, e.g. blind detection of, one or more messages, in particular a message carried by the control signaling, e.g. based on an assumed set of resources, which may be searched and/or listened for the control information. It may be assumed that both sides of the communication are aware of the configurations, and may determine the set of resources, e.g. based on the reference size.

Transmitting in downlink may pertain to transmission from the network or network node to the terminal. The terminal may be considered the WD. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for beamforming based inter-frequency load balancing for MU-MIMO for modifying a distribution of wireless devices among one or more beams/carriers.

Figure 2:
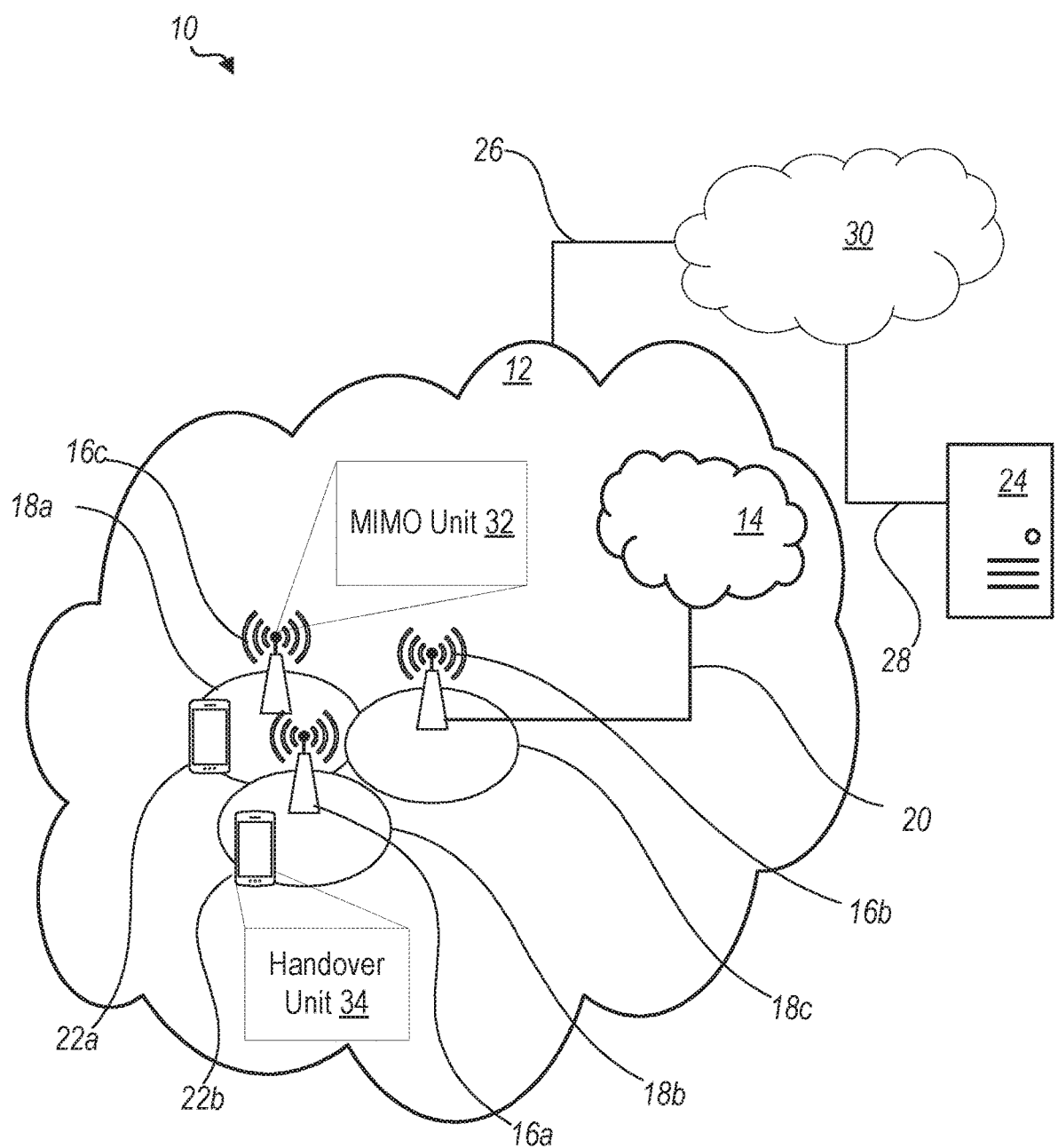
FIG. 2 is a schematic diagram of an exemplary network architecture illustrating a communication system connected via an intermediate network to a host computer according to the principles in the present disclosure.

Referring now to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a MIMO unit 32 which is configured to participate in beamforming based inter-frequency load balancing for MU-MIMO for modifying a distribution of wireless devices among one or more beams/carriers. A wireless device 22 is configured to include a handover unit 34 which is configured to participate in beamforming based inter-frequency load balancing for MU-MIMO for modifying a distribution of wireless devices among one or more beams/carriers.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to one or more of transmit, receive, forward, determine and analyze information related to beamforming based inter-frequency load balancing for MU-MIMO for modifying a distribution of wireless devices 22 among one or more beams/carriers.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include MIMO unit 32 configured to participate in beamforming based inter-frequency load balancing for MU-MIMO for modifying a distribution of wireless devices among one or more beams/carriers.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers. The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a handover unit 34 configured to participate in beamforming based inter-frequency load balancing for MU-MIMO for modifying a distribution of wireless devices among one or more beams/carriers over. In some embodiments, the inner workings of the network node 16, WD 22, and host computer 24 may be as shown in FIG. 3 and independently, the surrounding network topology may be that of FIG. 2.

Figure 3:
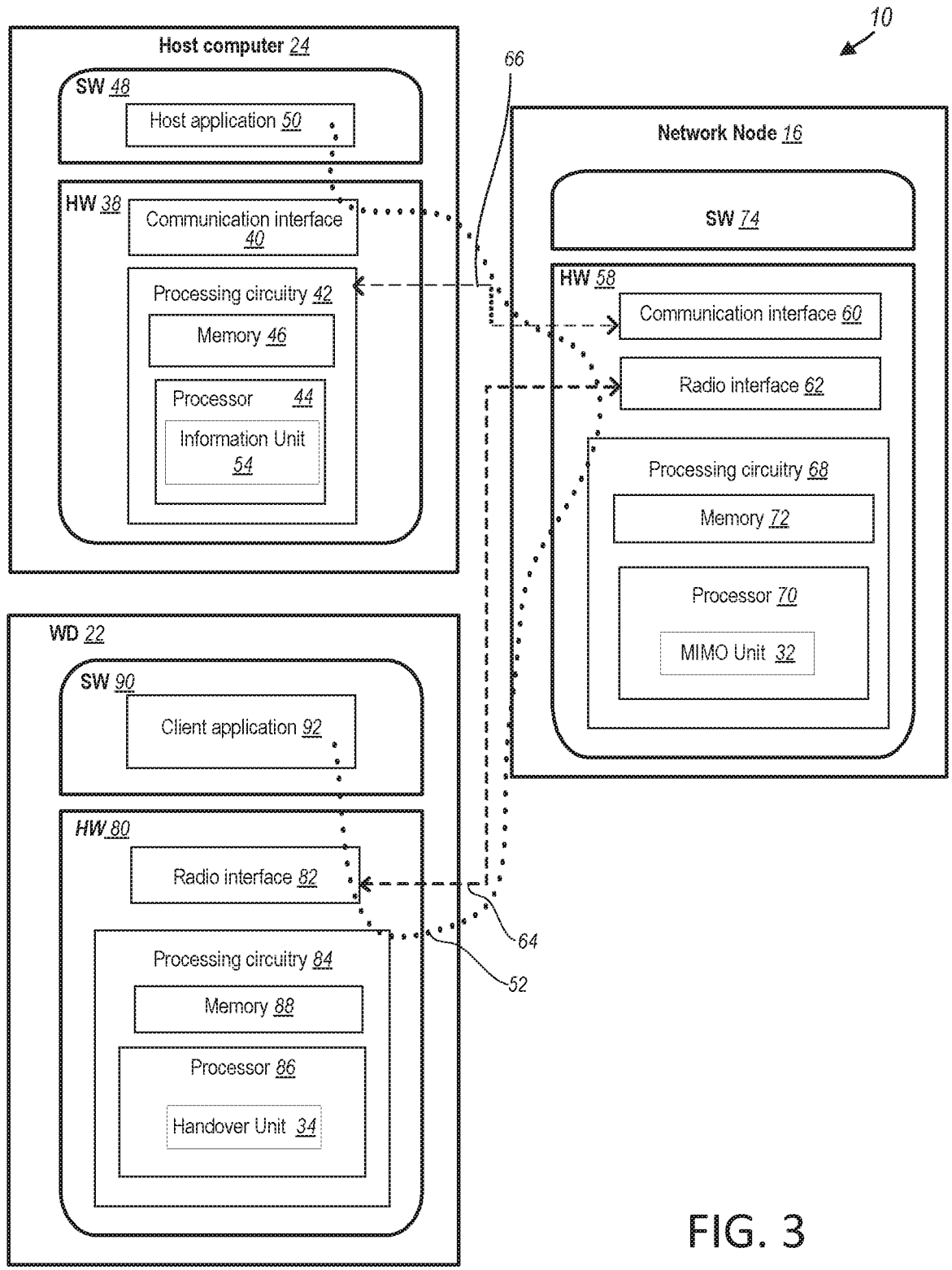
FIG. 3 is a block diagram of a host computer communicating via a network node with a wireless device over an at least partially wireless connection according to some embodiments of the present disclosure.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as MIMO unit 32, and Handover unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 4, 5:
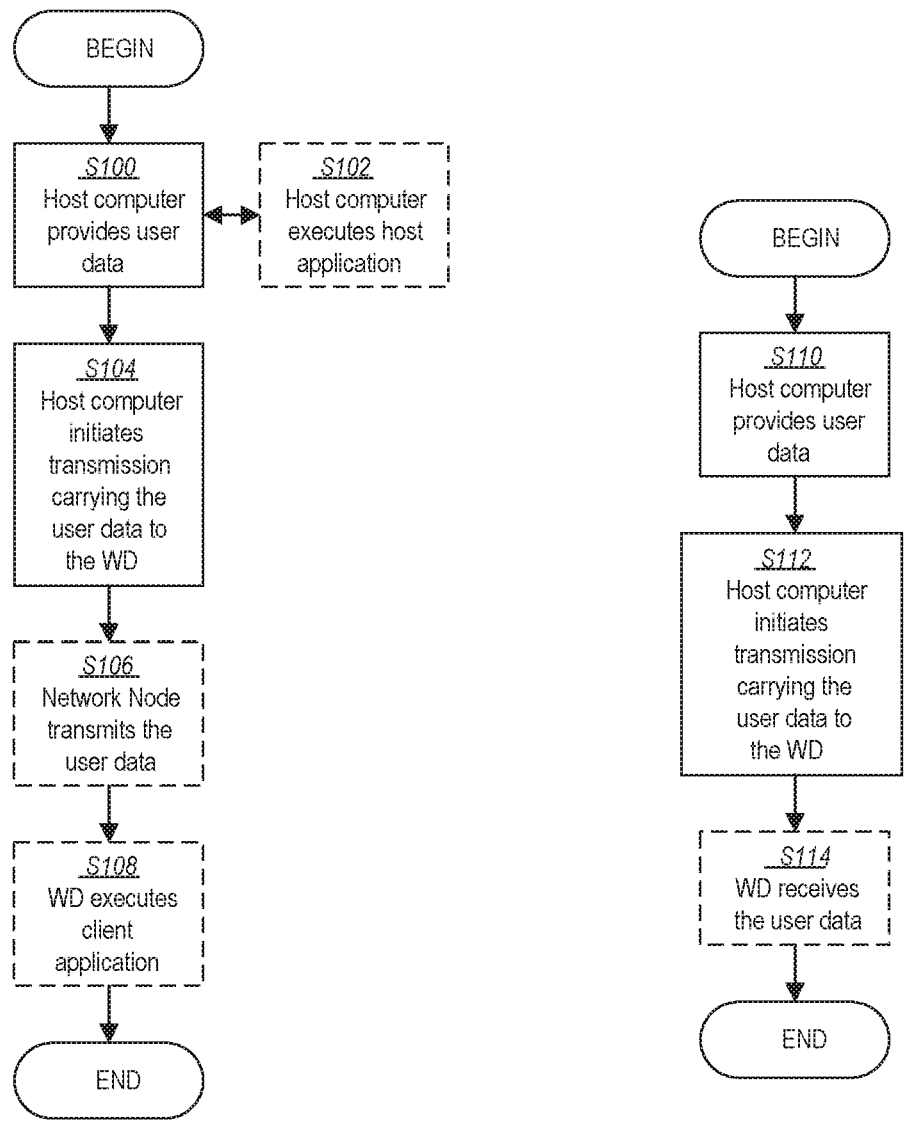
FIG. 4 is a flowchart illustrating exemplary methods implemented in a communication system including a host computer, a network node and a wireless device for executing a client application at a wireless device according to some embodiments of the present disclosure.
FIG. 5 is a flowchart illustrating exemplary methods implemented in a communication system including a host computer, a network node and a wireless device for receiving user data at a wireless device according to some embodiments of the present disclosure.

FIG. 4 is a flowchart illustrating an exemplary method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 114, associated with the host application 50 executed by the host computer 24 (Block S108).

FIG. 5 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 6 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 114, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 114 (Block S122). In providing the user data, the executed client application 114 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 7 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 8:
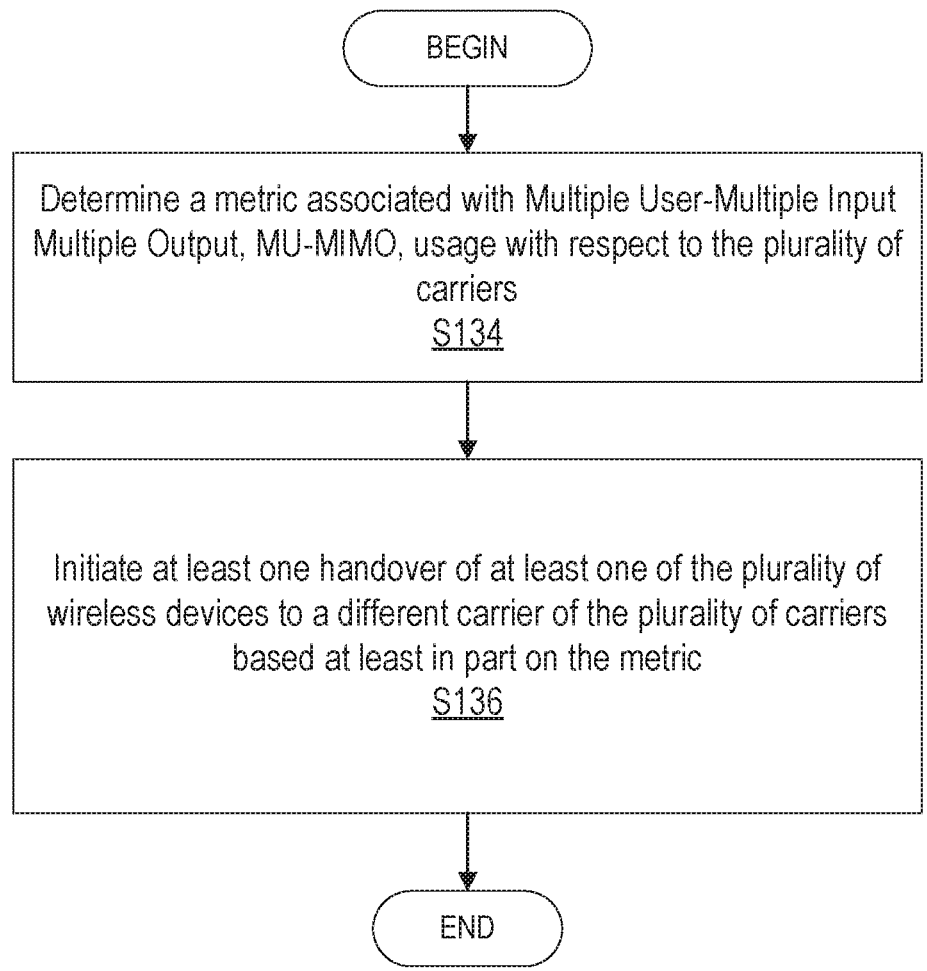
FIG. 8 is a flowchart of an exemplary process in a network node according to some embodiments of the present disclosure.

FIG. 8 is a flowchart of an exemplary process in a network node 16 according to some embodiments of the present disclosure. One or more Blocks and/or functions performed by network node 16 may be performed by one or more elements of network node 16 such as by MIMO unit 32 in processing circuitry 68, processor 70, communication interface 60, radio interface 62, etc. In one or more embodiments, network node 16 such as via one or more of processing circuitry 68, processor 70, radio interface 62 and communication interface 60 is configured to determine (Block S134) a metric associated with Multiple User-Multiple Input Multiple Output, MU-MIMO, usage with respect to the plurality of carriers. In one or more embodiments, the metric may be per beam. In one or more embodiments, the metric may be per carrier. In one or more embodiments, the metric one or more of corresponds to and/or is based at least in part on one or more measurements and/or measurement based calculations. For example, distribution of wireless devices 22 using beams and the MU-MIMO usage can be further defined by the following non-limiting examples of measurements including:

The number of scheduled wireless devices 22 per beam per carrier: Nrof_scheduled_WD(beam, carrier). When the WD(i) (The $i^{th}$ WD) is scheduled in a transmission time interval (TTI), the scheduled_WD(i) count is increased by one.

The total Nrof_scheduled_WD is the summation of all the scheduled_WD(i), where i=1 to N and N is the number of WDs in the beam.

MU-MIMO_count: To count how often WD(i) is pair scheduled to share the same physical resource with another WD in another beam in the same carrier (i.e., count of how often pairing for MU-MIMO occurs). If WD(i) is pair scheduled with another WD(j) in the other beam, then MU_MIMO_WD(i) is increased by one. The count in another beam for WD(j) is also increased by one.

The total MU-MIMO_count is the summation of all the MU_MIMO_WD(i) where i=1 to N and N is the number of WDs in the beam, i.e., the measurement results are the average of summation within a certain time period where the time period is configurable. As used herein in one or more embodiments, average time may be independent of and different from IFLB time period.

MU-MIMO efficiency index per beam per carrier:
MU_MIMO_effi_idx(beam, carrier) which may be defined as:
MU_MIMO_effi_idx(beam, carrier) equals to
MU_MIMO_count(beam, carrier)/Nrof_scheuled_WD (beam, carrier).

The larger MU_MIMO_effi_idx, the more efficient of the MU-MIMO usage. This carrier capacity may be aligned with the MU-MIMO efficiency index. When the MU-MIMO efficiency index is higher, this carrier capacity may be increased as well. This may provide feedback on the one or more methods described herein as to whether the method is working properly according to this property (i.e., a MU-MIMO efficiency index increase aligns with a carrier capacity increase).

Also, Nrof_scheduled_WD(beam, carrier) and MU_MIMO_effi_idx(beam, carrier), together with possible other measurements, collectively define the IFLB condition of the beam.

In one or more embodiments, network node 16 such as via one or more of processing circuitry 68, processor 70, radio interface 62 and communication interface 60 is configured to initiate (Block S136) at least one handover of at least one of the plurality of wireless devices 22 to a different carrier of the plurality of carriers based at least in part on the metric. For example, in one or more embodiments, initiating at least one handover (i.e., by transmitted a handover message or handover command message) of at least one of the plurality of wireless devices 22 to a different carrier of the plurality of carriers based at least in part on the metric may include one or more of the following steps.

Step 1: Beam Relation Info within Multiple Carriers

In one or more embodiments, an inter-frequency relation table (and/or equivalent data structure(s)) for the WDs 22 is one or more of built, maintained and updated for each beam. Inter-frequency relation table may also be referred to as frequency relation table. One example is shown in Table 1 where seven WDs 22, WD(22a) to WD(22g), are in and/or using and/or configured to use serving beam of B11, B11-B33 denote respective beams.

TABLE 1

| Inter-frequency relation table | | | | | | | | | |
|---|---|---|---|---|---|---|---|---|---|
| | C1 | | | C2 | | | C3 | | |
| | B11 | B12 | B13 | B21 | B22 | B23 | B31 | B32 | B33 |
| WD 22a | X | | | X | | | X | | |
| WD 22b | X | | | X | | | | | |
| WD 22c | X | | | | X | | | X | |
| WD 22d | X | | | | | | | | X |
| WD 22e | X | | | X | | | X | | |
| WD 22f | X | | | X | | | | | |
| WD 22g | X | | | X | | | X | | |

In Table 1, WD 22a is in and/or using and/or configured to use B11 and WD 22b is in and/or using and/or configured to use B11, and so on. B11 corresponds to beam 1 in carrier 1, B21 corresponds to beam 1 in carrier 2, etc. In other words, the leftmost quantity in B21 indicates the carrier while the rightmost quantity indicates the beam. C1 corresponds to carrier 1, C2 corresponds to carrier 2, etc. The "X" indicates that the wireless device can receive one or more signals from that beam and the signal strength of the one or more signals is higher than a predetermined threshold. The bold X ("X") indicates the severing beam/carrier for the respective wireless device 22. From the example in Table 1, WD 22a is served by carrier 1 and beam 1 (B11) and can also receive signals from B21 (carrier 2/beam 1) and B31 (carrier 3/beam 1). Further, in the example of Table 1, WD 22b can receive signal not only from B11 but also from B21 (beam 1/carrier 2). While a certain number of WDs 22, beams and carriers are illustrated in Table 1, the quantity of one or more of WDs 22, beams and carries may vary.

Step 2: Beam and Carriers Priority Tables

In one or more embodiments, a beam/carrier priority table (an example of which is illustrated in Table 2) is one of built, updated and modified, for each beam, based at least in part on Table 1. In particular, Table 2 is based at least in part on a number of WDs 22 that reside in a respective beam/carrier and that are also capable of receiving signals from other beam/carriers. In the example of Table 2, WD 22a and 22b reside and/or use and/or are configured to use B11 (carrier 1/beam 1) where these two WDs 22a and 22b are also capable of receiving signals from B21 (carrier 2, beam 1) and WD 22a can further receive signal from B31 (carrier 3/beam 1).

TABLE 2

| beam/carrier relation priority table for B11 | | |
|---|---|---|
| carriers, beam | related top priority carrier, beam | related the second high priority carrier, beam |
| B11 | B21 | B31 |

As illustrated in Table 2, B21 contains the highest number of WDs 22 (five WDs 22) that are resided in B11 (carrier 1 and beam 1) and are capable of receiving the signal from B21 (carrier 2 and beam 1), so the top priority beam to B11

(carrier 1/beam 1) is B21 (carrier 2/beam 1). After the top priority beam/carrier to B11 (carrier 1/beam 1) has been determined, the second highest number of WDs 22 in B11 (carrier 1/beam 1) which can receive a signal from another carrier and beam (three WDs 22 in B31) may be determined, and so on. Therefore, the beam/carrier relation table is where inter-frequency beam and carrier are determined for one or more beams. Again, for B11 (carrier 1 beam 1), its top related carrier is B21 (carrier 2/beam 1) as it contains the highest quantity of WDs 22 that reside in or use/are configured to use B11 but that are capable of receiving signals from another specific carrier/beam (e.g., B21)), i.e., WDs 22a, b, e, f and g reside in/use/are configured to use B11 but are also capable of receiving on B21 as illustrated in Table 1. The second priority is B31 (carrier 3/beam 1) as WDs 22a, e and g reside in/use/are configured to use B11 but are also capable of receiving on B31 as illustrated in Table 1. These relations in the one or more inter-frequency relation tables may be used for beam-based IFLB. In one or more embodiments, a determination is made as to which carrier/beam a beam-based IFLB request is going to be sent if the beam-based IFLB is implemented, i.e., if Blocks S134 and S136 are implement or performed. Further, Table 2 is one example based at least in part on Table 1. In one or more examples, several beams (e.g., B11, B32, etc.) may have the same quantity of WDs 22 from B11 that can receive signal(s) from other beams, i.e., WDs a, b, c, e, f and g residing in B11 may be capable of receiving signals from both B21 and B31, where then the beam number for building up the relation priority table could be selected randomly, or the selection could be based on other criteria, e.g., historical record, or relative signal strength if recorded.

Step 3: IFLB Request

One or more conditions/criteria (e.g., IFLB condition(s) and/or criteria and/or criterion) may be analyzed within each beam where this analysis may be performed periodically, for example. The condition(s) may be based at least in part on one or more measurements described with respect to Block S134 such as, for example, the condition(s) may provide one or more predefined thresholds for comparing one or more metrics (e.g., measurement(s) and/or based on measurement(s)) to the one or more predefined thresholds for triggering one or more actions (e.g., triggering Inter-Frequency Load Balance as described herein). For example, with respect to one carrier/beam, if the Nrof_scheduled_WD (beam, carrier) (an example of a metric) is less than a predefined threshold then the WDs 22 in this beam are not in high capacity and may be consolidated. In another example, if MU_MIMO_effi_idx (an example of a metric), with respect to a beam and carrier, is smaller than a predefined threshold, then the beam may not be efficiently used for MU-MIMO and IFLB (i.e., Blocks S134 and S136) may be performed to help improve MU-MIMO opportunities, for example. Thus, if one or more conditions are met such as based on one or more metrics, IFLB is triggered and an IFLB request or request message may be sent to initiate at least one handover. In one or more embodiments, the metric may be per beam. For example, assume that there are three beams B1, B2 and B3 in one carrier, and B1 and B2 are paired well with higher MU-MIMO count, but B2 and B2 are not. In this case, the overall MU-MIMO count in this carrier is good and it can only be distinguished if the measurement (metric) is per beam. Further, in one or more embodiments, the metric may be per carrier.

In one or more embodiments, the request message may be sent for the highest priority beam first, and if the request is accepted by the network node 16 for that beam, then handover may be arranged and/or initiated. In one or more embodiments, an IFLB confirmation and with beam information may be sent to another network node 16 to which the wireless device 16 is to transition to in case carriers are provided by different network nodes 16. If the request is rejected (as discussed below in Step 4), then the requested message may be sent for the second highest priority beam and so on until the request is accepted for a beam or all the beams in the beam/carrier priority table are rejected.

Step 4 IFLB Response

When the request (e.g., IFLB request) is received for a beam in another carrier, a load condition may be reviewed and/or analyzed for that beam in the carrier. The condition may define a maximum quantity of WDs 22 being served and/or service and/or are configured to be serviced on the beam. If the condition is not met, in this example with a defined maximum quantity of WDs 22, and the beam in this requested carrier is able to admit more WDs 22, then a response message (i.e., acceptance message) is sent indicating that at least one specific WD 22 or at least one WD 22, in general, is allowed to be handed over to the beam. Otherwise, a rejection message is transmitted.

Step 5 WD 22 Handover to a New Carrier

If an acceptation message is received such as received after the IFLB request is transmitted, the handover is arranged and/or initiated for the WD 22. The WD 22 to be handed over may be selected via one or more selection methods such as the selection method described below. Otherwise, a new IFLB request (i.e., request message) is sent to another carrier such as the carrier corresponding to the second priority relation or next highest priority relation in Table 2. For example, this new IFLB request may be repeated carrier by carrier in Table 2 until the IFLB request is accepted or until a predefined quantity of carriers or all of the carriers rejects the request.

In one or more embodiments, network node 16 may select the WD 22 for the handover based on a WD_MIMO_count associated with at least one carrier and/or beam for the wireless devices in the beam. For example, if the WD_MIMO_count is less than a predefined threshold, which shows the beam is not being used in a MU_MIMO efficient manner, then the WD 22 is selected to be handed over to another carrier.

Therefore, implementing IFLB helps at least part increases MU-MIMO efficiency with respect to one or more beams. In one or more embodiments, increased MU-MIMO efficiency includes increasing MU-MIMO opportunities for MU-MIMO capable WDs 22.

Figure 9:
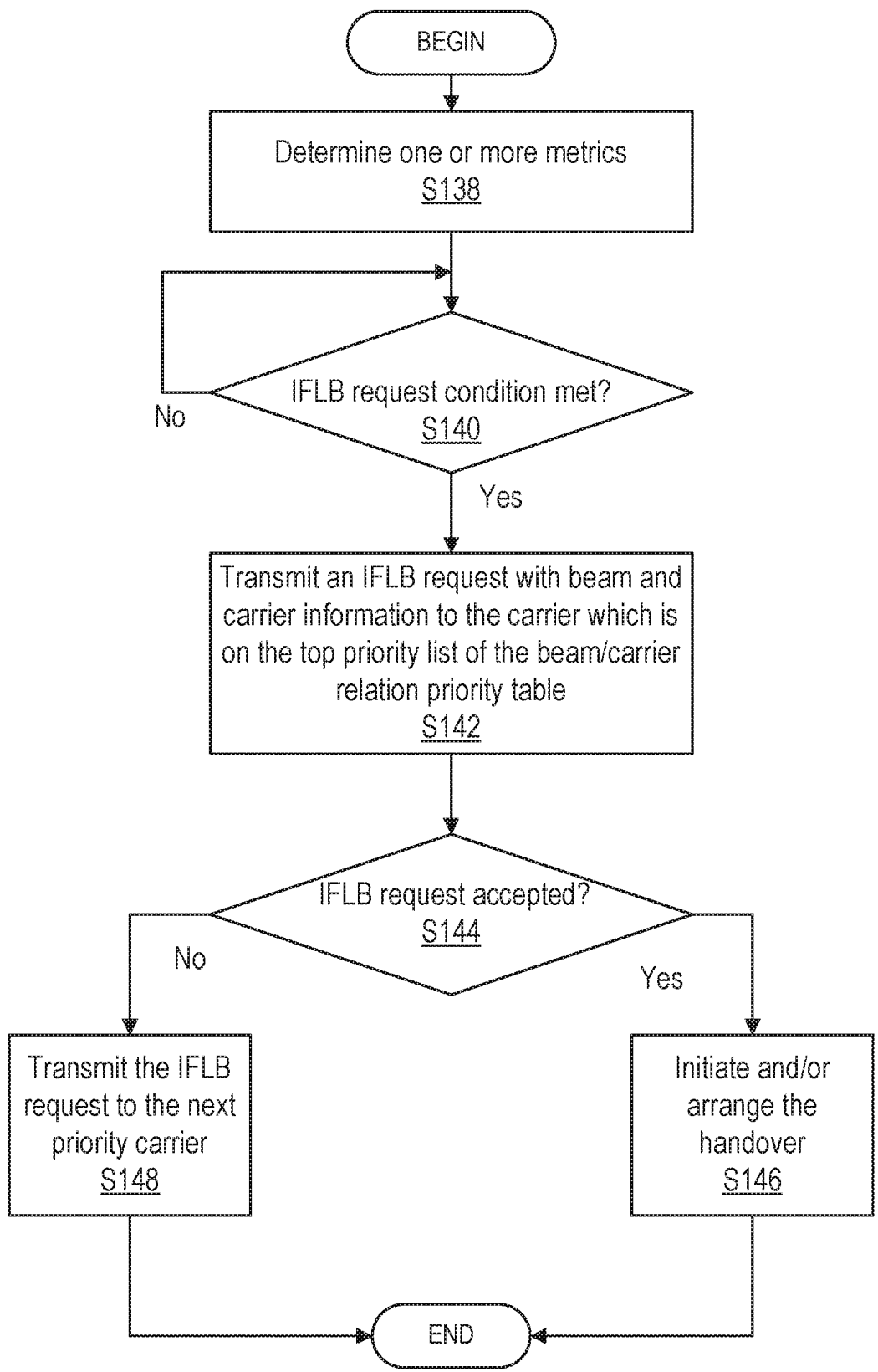
FIG. 9 is a flowchart of another exemplary process in a network node according to some embodiments of the present disclosure.

FIG. 9 is a flow diagram of another exemplary process in network node 16 according to some embodiments of the present disclosure. One or more Blocks and/or functions performed by network node 16 may be performed by one or more elements of network node 16 such as by MIMO unit 32 in processing circuitry 68, processor 70, communication interface 60, radio interface 62, etc. In one or more embodiments, network node 16 such as via one or more of processing circuitry 68, processor 70, radio interface 62 and communication interface 60 is configured to determine (Block S138) one or more metrics that may be based on one or more measurements are determined such as Nrof_Scheduled_WD and MU_MIMO_effi_idx. In one or more embodiments, network node 16 such as via one or more of processing circuitry 68, processor 70, radio interface 62 and communication interface 60 is configured to determine (Block S140) whether an IFLB request condition is met. For example, the IFLB condition may include one or more of the following:

Nrof_scheduled_WD<T_Nrof_scheduled_WD
MU_MIMO_effi_idx<T_MU_MIMO_effi_idx
where T_Nrof_scheduled_WD and T_MU_MIMO_effi_idx are predefined thresholds.

In one or more embodiments, network node 16 such as via one or more of processing circuitry 68, processor 70, radio interface 62 and communication interface 60 is configured to, if the determination is made that the IFLB condition is meet, transmit (Block S142) an IFLB request with beam and carrier information to the carrier which is on the top priority list of the beam/carrier relation priority table, an example of which is illustrated in Table 2. In one or more embodiments, network node 16 such as via one or more of processing circuitry 68, processor 70, radio interface 62 and communication interface 60 is configured to determine (Block S144) whether to IFLB request is accepted. In one or more embodiments, network node 16 such as via one or more of processing circuitry 68, processor 70, radio interface 62 and communication interface 60 is configured to, if the IFLB is accepted by the network node 16 providing that carrier that received the IFLB request, initiate and/or arrange (Block S146) the handover. In one or more embodiments, network node 16 such as via one or more of processing circuitry 68, processor 70, radio interface 62 and communication interface 60 is configured to, if the IFLB request is rejected, transmit (Block S148) the IFLB request to the next priority carrier where it the previous request was sent to the last carrier in the beam/carrier relation priority table, an action can be triggered such as a warning or alarm.

Figure 10:
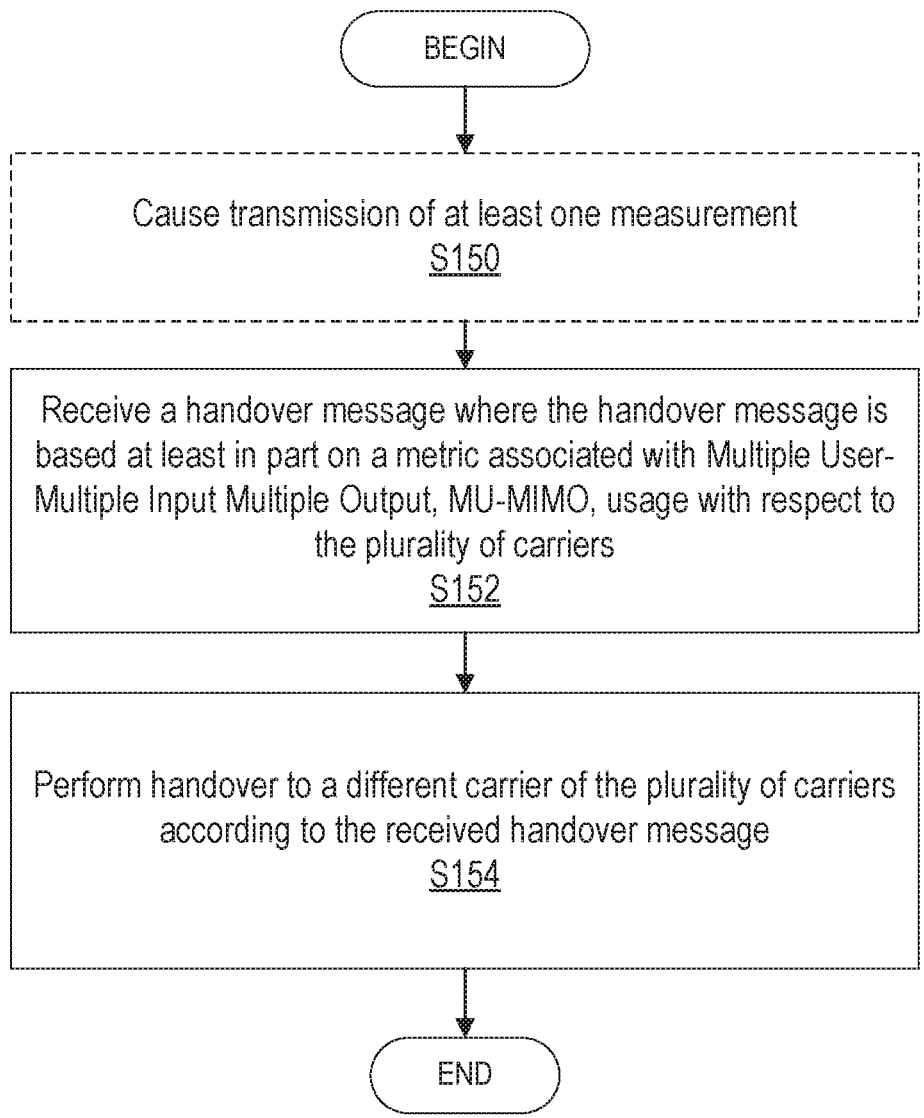
FIG. 10 is a flowchart of an exemplary process in a wireless device according to some embodiments of the present disclosure.

FIG. 10 is a flowchart of an exemplary process in a wireless device 22 according to some embodiments of the present disclosure. One or more Blocks and/or functions performed by wireless device 22 may be performed by one or more elements of wireless device 22 such as by handover unit 34 in processing circuitry 84, processor 86, radio interface 82, etc. In one or more embodiments, wireless device 22 such as via one or more of processing circuitry 84, processor 86 and radio interface 82 is configured to optionally cause (Block S150) transmission of at least one measurement. In one or more embodiments, wireless device 22 such as via one or more of processing circuitry 84, processor 86 and radio interface 82 is configured to receive (Block S152) a handover message where the handover message is based at least in part on a metric associated with Multiple User-Multiple Input Multiple Output, MU-MIMO, usage with respect to the plurality of carriers. In one or more embodiments, the handover message is triggered as described with respect to Block S136. In one or more embodiments, wireless device 22 such as via one or more of processing circuitry 84, processor 86 and radio interface 82 is configured to perform (Block S154) handover to a different carrier of the plurality of carriers according to the received handover message.

One or more of the following may be applicable to one or more embodiments described herein. In one or more embodiments, the handover configured to increase MU-MIMO opportunities for the plurality of wireless devices when compared to MU-MIMO opportunities before the at least one handover. In one or more embodiments, a respective quantity of wireless devices per each of the plurality of carriers remains the same following the at least one handover of the wireless device to the different carrier of the plurality of carriers. In one or more embodiments, a respective quantity of MIMO capable wireless devices per each of a plurality of beams are equal to each other following the at least one handover of the wireless device to the different carrier of the plurality of carriers.

In one or more embodiments, the metric associated with the MU-MIMO usage is a MU-MIMO efficiency index for the plurality of carriers and the plurality of beams, the MU-MIMO efficiency index being based at least in part on a quantity of scheduled wireless devices per beam per carrier and a quantity of how often a wireless device in one beam and carrier is pair scheduled to share a same physical resource with another wireless device in another beam and same carrier. In one or more embodiments, the metric associated with the MU-MIMO usage corresponds to carrier capacity, such that if the metric increases, the carrier capacity increases. In one or more embodiments, the processing circuitry is further configured to update a frequency relation table, the frequency relation table including information indicating which carriers and beams received by each of the plurality of wireless devices meet a predefined threshold. In one or more embodiments, the processing circuitry is further configured to prioritize at least one beam and carrier for at least one wireless device of the plurality of wireless devices based at least in part on the frequency relation table, the at least one handover of the at least one of the plurality of wireless devices to the different carrier of the plurality of carriers being based at least in part on the prioritization of the at least one beam and carrier.

In one or more embodiments, the at least one handover of the at least one of the plurality of wireless devices to the different carrier of the plurality of carriers is initiated if a quantity of scheduled wireless devices per beam per carrier is less than a predefined quantity threshold. In one or more embodiments, the at least one handover of the at least one of the plurality of wireless devices to the different carrier of the plurality of carriers is initiated if the metric associated with MU-MIMO usage is less than a predefined usage threshold. In one or more embodiments, the at least one handover corresponds to a redistribution of the plurality of wireless devices scheduled on respective carriers and beams.

Figure 11:
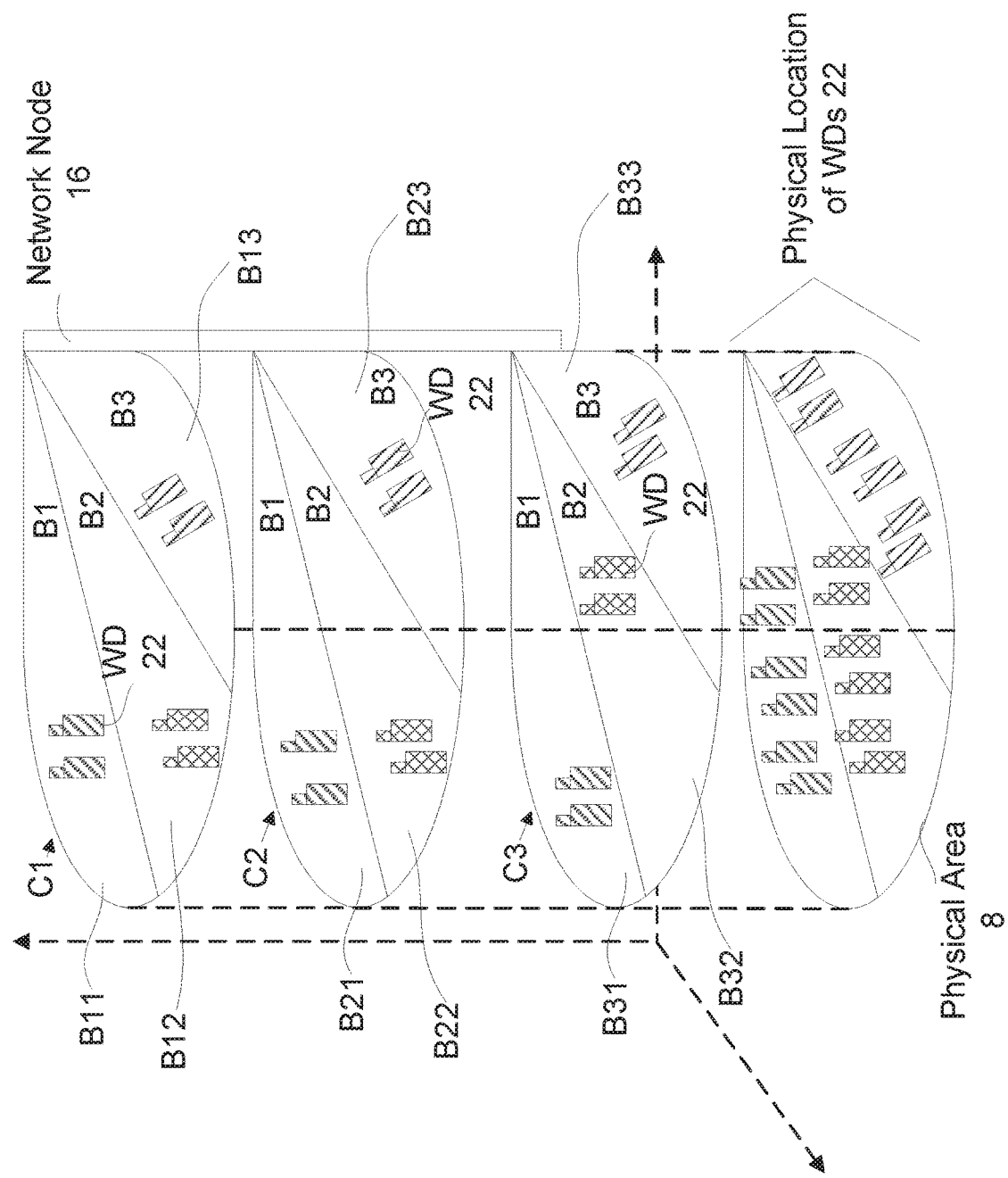
FIG. 11 is a diagram of a system implementing beamforming based inter-frequency load balancing for MU-MIMO in accordance with the principles of the disclosure.

FIG. 11 is a diagram of an example resultant WD 22 distribution after performing the process of FIG. 8 or FIG. 9, i.e., after performing the IFLB process. In particular, for ease of explanation, assume that the physical locations of the WDs 22 remains the same or substantially the same with respect to FIG. 1 (before the IFLB process is implemented), but several WDs have been redistributed to different carriers and/or separated out on various carriers in order to increase the MU-MIMO opportunities in this example. In FIG. 11, a beam may be referred to by its carrier/beam pairing denoted by BXY where X indicates the carrier and Y indicates the beam. For example, B11 refers to carrier 1/beam 1 while B33 refers to carrier 3/beam 3. In one or more embodiments, the quantity of WDs 22 per carrier remains the same as illustrated in the example of FIG. 11 where each carrier still supports six WDs 22 as compared to FIG. 1 (before the IFLB process is implemented). In contrast, network node 16 can now perform MU-MIMO via WD pairings in FIG. 11 as compared to FIG. 1 where pairing was severely hindered as MU-MIMO may use pairings of WDs 22 on the same carrier but having different beams. Further, while FIG. 11 illustrates one network node 16, in one or more embodiments, one or more carriers may be provided by one or more other network nodes 16 such as collocated network nodes 16 such that requests and responses described herein are communicated between network nodes 16.

Embodiments advantageously provide for beamforming based inter-frequency load balancing for MU-MIMO to modify a distribution of WDs 22 among one or more beams/carriers. In one or more embodiments, the WDs 22 are allocated among carriers such that the WDs 22 are distributed to different beams in each carrier such as to at least in part help increases the opportunity of MU MIMO usage, which may increase the throughput and capacity. In one or more embodiments, the beamforming based inter-frequency load balancing for MU-MIMO increases the opportunity of using MU-MIMO which may lead to cell (carrier) and/or network throughput and/or capacity increases. Further, in one or more embodiments, one or more of the measurements are either already measured in existing systems and/or relatively easy to measure, thus implementation of the teachings of the disclosure may be implemented with few modifications to existing systems. In one or more embodiments, if the load (e.g., network load, WD load, etc.) is heavy or over a predefined threshold (i.e., PRB usage is high or over a predefined threshold) in the network, the teachings of the disclosure can be implemented to help at least in part make the capacity and throughput of the cell (carrier) and/or network even higher when compared to the capacity and throughput before imitating handover as described herein. When the load is light (e.g., PRB usage is low), the teachings of the disclosure can be implemented to help at least in part consolidate the network which may allow for one or more carriers to be shut down without affecting capacity. Shutting down one or more carriers may help one or more reduce interference, increase power savings, etc.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
MIMO Multiple in and multiple out
MU-MIMO Multi user MIMO
IFLB Inter frequency Load Balance
UE User Equipment It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node for servicing a plurality of wireless devices using a plurality of carriers, each carrier of the plurality of carriers being configured with a respective plurality of beams, the network node comprising:
processing circuitry configured to:
determine a metric based on Multiple User-Multiple Input Multiple Output, MU-MIMO, usage with respect to the plurality of carriers; and
initiate at least one handover of at least one of the plurality of wireless devices to at least one different carrier of the plurality of carriers based at least in part on the metric.

2. The network node of claim 1, wherein the at least one handover is configured to increase MU-MIMO opportunities for the plurality of wireless devices when compared to MU-MIMO opportunities before the at least one handover.

3. The network node of claim 1, wherein the at least one handover of at least one of the plurality of wireless devices to at least one different carrier includes to at least two handovers of at least two wireless devices of the plurality of wireless devices to at least two different carriers of the plurality of carriers; and
a respective quantity of wireless devices per each of the plurality of carriers remains the same following the at least two handovers of the at least two wireless devices to the at least two different carriers of the plurality of carriers.

4. The network node of claim 1, wherein a respective quantity of MIMO capable wireless devices per each of a plurality of beams are equal to each other following the at least one handover of the at least one of the plurality of wireless devices to the at least one different carrier of the plurality of carriers.

5. The network node of, claim 1, wherein the metric that is based on the MU-MIMO usage is an MU-MIMO efficiency index for the plurality of carriers and the plurality of beams, the MU-MIMO efficiency index being based at least in part on a quantity of scheduled wireless devices per beam per carrier and a quantity of how often a wireless device in one beam and carrier is pair scheduled to share a same physical resource with another wireless device in another beam and same carrier.

6. The network node of claim 1, wherein the metric that is based on the MU-MIMO usage corresponds to carrier capacity, such that if the metric increases, the carrier capacity increases.

7. The network node of claim 1, wherein the processing circuitry is further configured to update a frequency relation table, the frequency relation table including information indicating which carriers and beams received by each of the plurality of wireless devices meet a predefined threshold.

8. The network node of claim 7, wherein the processing circuitry is further configured to prioritize at least one beam and carrier for at least one wireless device of the plurality of wireless devices based at least in part on the frequency relation table, the at least one handover of the at least one of the plurality of wireless devices to the at least one different carrier of the plurality of carriers being based at least in part on the prioritization of the at least one beam and carrier.

9. The network node of claim 1, wherein the at least one handover of the at least one of the plurality of wireless devices to the at least one different carrier of the plurality of carriers is initiated if a quantity of scheduled wireless devices per beam per carrier is less than a predefined quantity threshold.

10. The network node of claim 1, wherein the at least one handover of the at least one of the plurality of wireless devices to the at least one different carrier of the plurality of carriers is initiated if the metric that is based on MU-MIMO usage is less than a predefined usage threshold.

11. The network node of claim 1, wherein the at least one handover corresponds to a redistribution of the plurality of wireless devices scheduled on respective carriers and beams.

12. The network node of claim 1, wherein the metric is one of per beam and per carrier.

13. A method for a network node for servicing a plurality of wireless devices using a plurality of carriers, each carrier of the plurality of carriers being configured with a respective plurality of beams, the method comprising:
determining a metric based on Multiple User-Multiple Input Multiple Output, MU-MIMO, usage with respect to the plurality of carriers; and
initiating at least one handover of at least one of the plurality of wireless devices to at least one different carrier of the plurality of carriers based at least in part on the metric.

14. The method of claim 13, wherein the at least one handover is configured to increase MU-MIMO opportunities for the plurality of wireless devices when compared to MU-M IMO opportunities before the at least one handover.

15. The method of claim 13, wherein the at least one handover of at least one of the plurality of wireless devices to at least one different carrier includes to at least two handovers of at least two wireless devices of the plurality of wireless devices to at least two different carriers of the plurality of carriers; and
a respective quantity of wireless devices per each of the plurality of carriers remains the same following the at least two handovers of the at least two wireless devices to the at least two different carriers of the plurality of carriers.

16. The method of claim 13, wherein a respective quantity of wireless devices per each of a plurality of beams is different following the at least one handover of the at least one of the plurality of wireless devices to the at least one different carrier of the plurality of carriers.

17. The method of claim 13, wherein the metric that is based on the MU-MIMO usage is an MU-MIMO efficiency index for the plurality of carriers and the plurality of beams, the MU-MIMO efficiency index being based at least in part on a quantity of scheduled wireless devices per beam per carrier and a quantity of how often a wireless device in one beam and carrier is pair scheduled to share a same physical resource with another wireless device in another beam and same carrier.

18. The method of claim 13, wherein the metric that is based on the MU-MIMO usage corresponds to carrier capacity, such that if the metric increases, the carrier capacity increases.

19. The method of claim 13, further comprising updating a frequency relation table, the frequency relation table including information indicating which carriers and beams received by each of the plurality of wireless devices meet a predefined threshold.

20. The method of claim 19, further comprising prioritizing at least one beam and carrier for at least one wireless device of the plurality of wireless devices based at least in part on the frequency relation table, the at least one handover of the at least one of the plurality of wireless devices to the at least one different carrier of the plurality of carriers being based at least in part on the prioritization of the at least one beam and carrier.

21. The method of claim 13, wherein the at least one handover of the at least one of the plurality of wireless devices to the at least one different carrier of the plurality of carriers is initiated if a quantity of scheduled wireless devices per beam per carrier is less than a predefined quantity threshold.

22. The method of claim 13, wherein the at least one handover of the at least one of the plurality of wireless devices to the at least one different carrier of the plurality of carriers is initiated if the metric that is based on MU-MIMO usage is less than a predefined usage threshold.

23. The method of claim 13, wherein the at least one handover corresponds to a redistribution of the plurality of wireless devices scheduled on respective carriers and beams.

24. The method of claim 13, wherein the metric is one of per beam and per carrier.

* * * * *